United States Patent [19]

Konagaya et al.

[11] Patent Number: 4,695,383
[45] Date of Patent: Sep. 22, 1987

[54] PERMSELECTIVE MEMBRANE

[75] Inventors: Shigeji Konagaya; Osamu Watanabe, both of Ootsu; Hideshi Kuzumoto, Shiga; Masaya Tokai, Takatsuki; Haruhiko Narusawa, Ootsu; Yasuo Kato, Shiga, all of Japan

[73] Assignee: Toyo Boseki Kabushiki Kaisha, Osaka, Japan

[21] Appl. No.: 22,624

[22] Filed: Mar. 5, 1987

[30] Foreign Application Priority Data

Mar. 12, 1986 [JP] Japan .................................. 61-55597
Apr. 17, 1986 [JP] Japan .................................. 61-88697
Apr. 17, 1986 [JP] Japan .................................. 61-88698

[51] Int. Cl.$^4$ ............................................. B05D 5/00
[52] U.S. Cl. .......................... 210/500.37; 210/500.41; 210/500.23; 521/64; 521/184; 521/185; 528/337
[58] Field of Search ..................... 210/500.41, 500.37, 210/500.23; 521/64, 184, 185

[56] References Cited

U.S. PATENT DOCUMENTS

| | | | |
|---|---|---|---|
| 4,269,967 | 5/1981 | Elfert et al. | 210/500.41 |
| 4,273,903 | 6/1981 | Rose | 210/500.14 |
| 4,292,417 | 9/1981 | Ishii et al. | 210/500.41 |
| 4,520,044 | 5/1985 | Sundet | 210/500.41 |

Primary Examiner—Morton Foelak
Attorney, Agent, or Firm—Wenderoth, Lind & Ponack

[57] ABSTRACT

A permselective membrane suitable for obtaining fresh water by the desalination of sea water and salt water is provided herein, said permselective membrane being prepared by the reaction of an aromatic polycarboxylic acid component with a mixed diamine component comprising a diaminodiphenylsulfone compound of the formula (I),

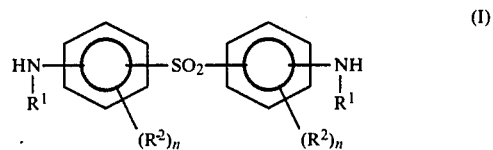

(I)

wherein $R^1$ is hydrogen atom or a $C_1$–$C_{12}$ hydrocarbon group, $R^2$s may be same or different, each representing a monovalent organic group, and n is an integer of 0 or 1 to 3, and an alicyclic diamine compound containing two secondary amino groups in the same or different ring(s).

20 Claims, No Drawings

PERMSELECTIVE MEMBRANE

The present invention relates to a permselective membrane prepared from a particular copolyamide, particularly a permselective membrane suitable to obtain fresh water by the desalination of sea water and salt water.

A permselective method wherein a solution of one or more substances in a common solvent is sent to a permselective membrane under a pressure higher than the osmotic pressure of the solution, thereby enabling the components in the solution to be separated selectively, and a reverse osmotic method which permits the passage of water, but not salts dissolved therein are known from of old. In these methods, substantially the same semipermeable membranes called a permselective membrane or reverse osmosis membrane are used (hereinafter, the both membranes together are referred to as permselective membrane). This permselective membrane includes two kinds of membrane: One is a membrane comprising polymeric substances and having a dense and homogeneous structure in either the form of extremely thin layer on a support or the form of hollow fiber, and the other is a membrane having a heterogeneous structure of "anisotropic gel" membranes comprising a dense, polymeric surface layer of, generally, from 0.1 to 0.2 micron or less in thickness and a porous underlying layer which is a support for this thin surface layer. Both the high permeability to water flux and desalination ability of this heterogeneous-structure membrane depend upon the thin and dense, polymeric surface layer attached to one side of the membrane, and this heterogeneous-structure membrane is also called asymmetric membrane.

Hitherto, cellulose acetate has been used industrially as a polymer forming permselective membranes, but cellulose acetate membranes gave rise to problems in terms of resistance to hydrolysis and microorganisms, membranes life, etc. In order to solve these problems, permselective membranes comprising aromatic polyamides are known as a novel material for membrane substituting for cellulose acetate (Japanese Patent Publication No. 43540/1978). This well-known permselective membrane has a defect that it is short of durability to oxidative chlorine used as a disinfectant for water, i.e. resistance to chlorine. Next, reverse osmosis membranes obtained by crosslinking an aromatic diamine compound (e.g. m-phenylenediamine, p-phenylenediamine) with an aromatic polyacid halide (e.g. trimesic acid chloride) are proposed [Japanese Patent Applicastion Kokai (Laid-open) No. 147106/1980]. The above patent discloses that this reverse osmosis membrane has both a very good reverse osmosis property and chlorine resistance. Further, anisotropic reverse osmosis membranes of good chlorine resistance comprising a polyamide obtained by the reaction of a piperazine diamine with an aromatic dicarboxylic acid are known [Japanese Patent Application Kokai (Laid-open) No. 109271/1974].

Still further, polyamides of excellent thermal resistance such as polyisophthaloyl homopiperazine, polyterephthaloyl homopiperazine, etc. produced with homopiperazine having a similar chemical structure to piperazine compounds are proposed (U.S. Pat. No. 3395122). However, nothing is known about the preparation of permselective membranes with these polyamides.

The reverse osmosis membranes disclosed in the foregoing patent application No. 147106/1980 have chlorine resistance, but their chlorine resistance was found to be too short-lived to use them over a long period of time. Also, the foregoing polyamides produced with piperazine or homopiperazine are sparingly soluable in organic solvents normally used for membrane formation such as N,N-dimethylacetamide, N-methyl-2-pyrrolidone, etc., being only soluble in protic solvents such as formic acid, m-cresol, etc. which are dangerous to handle. Because of this, industrial production of permselective membranes with these polyamides was found to be difficult.

The present inventors made a study on the film-forming property, permselectivity and chlorine resistance of copolyamides produced with an alicyclic diamine compound (e.g. piperazine compounds, homopiperazine) and an aromatic diamine compound, and as a result, found that the above properties depend upon the chemical structure of the aromatic diamine compound of the copolyamides. The present inventors thus completed the present invention.

The present invention provides a permselective membrane consisting mainly of a copolyamide prepared by the reaction of a mixed diamine component comprising an alicyclic diamine compound containing two secondary amino groups in the same or different ring(s) and a diaminodiphenylsulfone compound with an aromatic polycarboxylic acid component, the molar ratio of the alicyclic diamine compound to diaminodiphenylsulfone compound being 5/95 to 65/35.

The copolyamide used in the present invention has a mixed diamine component comprising two kinds of diamine compound, and a diaminodiphenylsulfone compound which is one diamine compound of the mixed diamine component, is represented by the general formula (I),

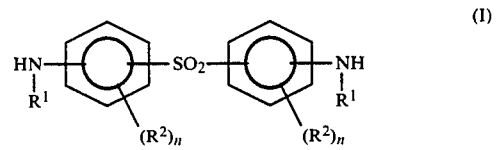

(I)

wherein $R^1$ represents hydrogen atom or a $C_1$–$C_{12}$ hydrocarbon group, $R^2$s may be the same or different, each representing a monovalent organic group, and n represents an integer of 0 or 1 to 3.

The foregoing diaminophenylsulfone compound and its derivative include 3,3'-diaminophenylsulfone, 3,4'-diaminodiphenylsulphone, 4,4'-diaminodiphenylsulfone, 3,3'-dinitro-4,4'-diaminodiphenylsulfone, etc., and those which are particularly preferred are 3,3'-diaminodiphenylsulfone and 4,4'-diaminodiphenylsulfone in terms of film strength. It is also possible to use two or more of these diaminodiphenylsulfone compounds in mixture in suitable proportions. When a 3,3'-diaminodiphenylsulfone compound and a 4,4'-diaminodiphenylsulfone compound are used in mixture, their molar ratio is 0/100 to 100/0, and preferably 50/50 to 0/100 in terms of salt rejection, etc.

The alicyclic diamine compound containing two secondary amino groups in the same or different ring(s) is a six-membered alicyclic diamine compound represented by the general formula (IV),

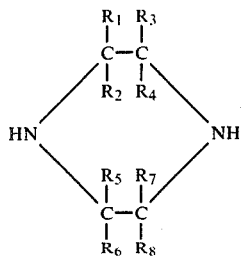

wherein $R_1$, $R_2$, $R_3$, $R_4$, $R_5$, $R_6$, $R_7$ and $R_8$ may be all or partly same or different and each of them represents hydrogen atom or a $C_1$–$C_{12}$ hydrocarbon group, or homopiperazine which is a seven-membered alicyclic diamine compound represented by the formula (V),

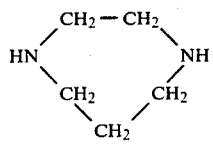

etc.

The piperazine compound includes piperazine, 2-methylpiperazine, trans-2,5-dimethylpiperazine, cis-2,5-dimethylpiperazine, 2,6-dimethylpiperazine, 2,3,5-trimethylpiperazine, 2,2,3,3,5,5,6,6-octamethylpiperazine, 2,2,5,5-tetramethylpiperazine, 2,2,3,5,5,6-hexamethylpiperazine, 2-ethylpiperazine, 2,5-diethylpiperazine, 2,3,5-triethylpiperazine, 2,2,3,5,5,6-hexaethylpiperazine, 2,3,5,6-tetraethylpiperazine, 2-n-propylpiperazine, 2,6-di-n-propylpiperazine, 2,3,5-tri-n-propylpiperazine, 2,3,5,6-tetra-n-propylpiperazine, 2-n-butylpiperazine, 2,5-di-n-butylpiperazine, 2,5-di-tert-butylpiperazine, 2,3,5-tri-n-butylpiperazine, 2-pentylpiperazine, 2-decylpiperazine, 2,5-divinylpiperazine, 2,5-diphenylpiperazine, 2-phenylpiperazine, 2,3,5,6-tetraphenylpiperazine, 2-naphthylpiperazine, 2,5-dinaphthalpiperazine, 2-tolylpiperazine, 2,5-ditolylpiperazine, 2,3,5,6-tetratolylpiperazine, etc. Of these compounds, particularly preferred ones are piperazine and trans-2,5-dimethylpiperazine in terms of salt rejection.

These alicyclic compounds can be used in a mixture of two or more of them.

The mixing ratio of the diaminodiphenylsulfone compound (I) and alicyclic diamine compound [(IV) and/or (V)] which are components of the mixed diamine component is 95/5 to 35/65, preferably, 90/10 to 40/60, particularly preferably 90/10 to 60/40 in molar ratio. When the component of the alicyclic diamine compound is less than 5 mole %, obtaining a good permselectivity is not only impossible, but the chlorine resistance of the membrane becomes also poor. While when said content is more than 65 mole %, high polymers are difficult to obtain and the film-forming property becomes poor.

The aromatic polycarboxylic acid component of the copolyamides of the present invention includes phthalic acid, isophthalic acid, terephthalic acid, 4,4'-diphenyldicarboxylic acid, 1,2-, 1,3-, 1,4-, 1,5-, 1,6-, 1,7-, 1,8-, 2,3-, 2,6-, and 2,7-naphthalene dicarboxylic acids, the acid halide of these compounds, etc. Also, there are given compounds having three or more reactive groups to amines such as aromatic tricarboxylic acids (e.g. trimesic acid, trimellitic acid) and their acid halides; pyromellitic acid, benzophenonetetracarboxylic acid and their acid halides; and 3-chlorosulfonylisophthalic acid chloride. Of these acid components, terephthalic acid, isophthalic acid and their acid halides are preferred. These acid components may be used in a mixture of them in any proportion, but a proportion of terephthalic acid to isophthalic acid of from 50/50 to 0/100 is preferred in terms of the solubility of polymer in organic solvent.

For producing the copolyamides by the reaction of the mixed diamine compoenent with the aromatic polycarboxylic acid component, polymerization methods used to produce the common polyamides, for example fusion polymerization, solid-state polymerization, interfacial polymerization, solution polymerization, etc. can be used. Of these methods, solution polymerization and interfacial polymerization are preferred.

Various organic solvents can be used as a solvent for solution polymerization, and amide solvents are particularly preferred. The amide solvents include N-methyl-2-pyrrolidone, hexamethyl phosphoramide, N,N-dimethylacetamide, N,N-dimethylformamide and mixtures thereof. These amide solvents may be used in mixture with a chlorine-containing solvent such as methylene chloride, chloroform, 1,2-dichloroethane, 1,1,2-trichloroethane, 1,1,2,2-tetrachloroethane, chlorobenzene, etc. The mixing ratio of the amide solvent to the chlorine-containing solvent varies with the mixing ratio of the mixed diamine component to the acid component, but generally, a range of from 50/50 to 95/5 in molar ratio is preferred.

The general solution polymerization method will be explained below: The above mixed diamine compounds are dissolved in the above amide solvent or a mixed solvent of the amide solvent and the chlorine-containing solvent, and after adding a polycarboxylic acid halide or its solution, reacted with the halide with stirring. The reaction temperature is preferably from $-20°$ to $100°$ C., more preferably from $-5°$ to $70°$ C. In carrying out the above polymerization reaction, in order to neutralize hydrogen chloride formed by the polymerization and/or facilitate the dissolution of the resulting polymer, various kinds of inorganic compound and organic compound may be added as an additive before, during and after polymerization. The inorganic compound includes lithium chloride, calcium chloride, potassium chloride, lithium carbonate, lithium oxide, lithium hydroxide, calcium hydroxide calcium carbonate, etc. The organic compound includes pyridine, triethylenediamine, triethylamine, tri-n-propylamine, tri-n-butylamine, N-ethylpiperidine, N-allylpiperidine, N-methylmorpholine, N-ethylmorpholine, N-allylmorpholine, N,N-dimethylaniline, N,N-diethylaniline, N,N-dimethylpiperazine, etc. Of these compounds, N,N-dimethylaniline, N,N-diethylaniline, pyridine and triethylamine are preferred. The amount of the additive added is generally from 0.5 to 1.5 times by mole, preferably 1.0 time by mole based on hydrogen chloride evolved. Also, as an additive, a compound having only one group capable of reacting with an amino or acid halide group may be added as a short stopper, as need arises. The total concentration of the components in solution polymerization reaction is preferably from 5 to 35 wt. %. After completion of the solution polymerization, the copolymer produced is solidified by mixing the polymerization solution with a coagulation bath which is compatible with the above solvent, but does not dissolve the copolymer such as methanol, water, etc. This solidified product is filtered off, repeatedly washed with water and methanol and dried to obtain the desired copolymer.

Next, the general interfacial polymerization method will be explained. The organic solvent of the organic phase used in interfacial polymerization includes chlorine-containing hydrocarbons such as methylene chloride, chloroform, tetrachloride, chlorobenzene, 1,1,2,2-tetrachloroethane, etc.; aliphatic hydrocarbons such as N-hexane, n-octane, cyclohexane, etc.; aromatic hydrocarbons such as xylene, benzene, toluene, etc.; and mixtures of these solvents. On the other hand, water is most preferred for the aqueous phase, but a proper amount of hydrophilic organic solvent (e.g. methanol, ethanol, acetone) may be added. Also, substances which trap hydrogen chloride evolved during interfacial polymerization include sodium hydroxide, sodium carbonate, lithium hydroxide, lithium carbonate, potassium hydroxide, etc. Particularly, sodium hydroxide and sodium carbonate are preferred. The amount of these trapping agents is in the range of from 0.5 to 1.5 times by mole based on hydrogen chloride evolved, being properly selected according to the kind of the metal salt.

The copolyamide is also obtained by mechanical mixing of an aqueous solution of the mixed diamine component and the hydrogen chloride-trapping agent with a solution of the polycarboxylic acid halide compound in the organic solvent described above. Previous mechanical mixing of the above aqueous mixed diamine solution with a part of the organic phase is preferred. In order to promote the dissolution of the mixed diamine into water, a surface active agent and a suitable organic solvent which acts as a good solvent for the mixed diamine may be added. The concentration of the mixed diamine in the aqueous solution and that of the polycarboxylic acid halide in the organic solvent solution are preferably from 0.3 to 10 wt. %. This concentration is properly selected according to the solubility of the above two diamines in water. The copolyamide produced is separated from the polymer solution obtained by the interfacial polymerization in the same manner as in the solution polymerization described above, i.e. by mixing the solution with ethanol, water, etc. to solidify the polymer which is then filtered off, washed with water and dried.

The permselective membrane is formed by dissolving the copolyamide obtained by the above various polymerization methods in a suitable organic solvent, coating the copolyamide solution onto a suitable plate such as glass plate, metallic plate, etc. and dipping the plate in a coagulation liquid which does not dissolve the copolyamide, but is compatible with the organic solvent. The permselective membrane is also formed by vaporizing the organic solvent from the plate. Hollow fibers of the copolyamide can be formed by spinning the copolyamide solution from a nozzle. Further, composite sheets can be obtained by coating the copolyamide solution onto a suitable porous film and forming the membrane in the same manner as above.

At the time of the above film formation, for the purpose of regulating the distribution of pore diameter of the membrane, a micropore-forming agent may be added to the copolyamide solution. The micropore-forming agent includes inorganic compounds such as lithium chloride, magnesium chloride, calcium chloride, etc.; and organic compounds such as ethylene glycol, polyethylene glycol, glycerin, their derivatives, etc.

For the above porous film, porous films comprising polymeric compounds such as polyethylene, polysulfone, polypropylene, polyimide, etc. and porous substances comprising inorganic subatances such as silica gel, alumina, silica alumina, zeolite, etc. are suitable. As a method for coating the porous films, any of methods such as dipping, roll coating, quick coating, etc. will do. The thickness of the resulting membrane is adjusted so as to be from 0.05 to 1.0 micron, preferably from 0.1 to 0.5 micron.

In place of coating the copolyamide solution onto the porous film, the copolyamide membrane can be formed on the porous film by coating the above mixed diamine solution onto the film and dipping the film in an organic solvent solution of the dicarboxylic acid chloride for a required period of time. In this case, in order to increase the strength of the membrane, compounds having three or more reactive groups to amines such as trimesic acid chloride, trimellitic acid chloride, pyromellitic acid chloride, benzophenonetetracarboxylic acid chloride, 3-chlorosulfonylisophthalic acid chloride, etc. may be added.

Copolyamides obtained with a mixed diamine component comprising a piperazine compound and/or homopiperazine and a diaminodiphenylsulfone compound and an aromatic polycarboxylic acid component are soluable in organic solvents such as dimethylacetamide, N-methyl-pyrrolidone, dimethylformamide, etc., so that their film-forming property is good. The permselective membranes obtained have excellent permselectivity and particularly excellent chlorine resistance.

The present invention will be further explained by referring to the following examples which are given for illustration purpose only and not for limitation of the scope of the present invention.

EXAMPLE 1

200 Milliliters of N-methylpyrrolidone and 28 ml of triethylamine were added to 19.84 g (0.08 mole) of 3,3'-diaminodiphenylsulfone and 1.72 g (0.02 mole) of piperazine, and the resulting mixture was supplied under a nitrogen stream to a 500-ml four-necked flask equipped with a nitrogen-feed pipe, a thermometer and a stirrer. After thorough stirring, 20.31 g (0.1 mole) of isophthalic acid dichloride was added quickly under a nitrogen stream while ice-cooling the entire reaction system. After carrying out reaction for about 60 minutes with ice-cooling, the temperature was returned to room temperature, and the reaction system was stirred for further about 1 hour. After completion of the reaction, the reaction solution was poured into 1500 ml of methanol to precipitate a copolyamide. Unreacted products and the solvent were removed from this precipitate by repeating several cycles of crushing by home mixer, filtration and washing with water. Finally, the precipitate was washed with methanol and dried at 140°C. for 48 hours in a vacuum to obtain purified copolyamide. The yield of the purified product was about 81%, the reduced specifc viscocity (0.5 g/dl sulfuric acid, 30°C.) of the product was 0.70 and the piperazine content of the product obtained by proton NMR was 21% based on the total amount of the diamines.

EXAMPLE 2

A purified copolyamide was obtained in the same manner as in Example 1 except that terephthalic acid dichloride was used in place of isophthalic acid dichloride. The yield of the resulting purified product was about 84%, and the reduced specific viscosity of the product was 0.73.

EXAMPLE 3

A purified copolyamide was obtained in the same manner as in Example 2 except that 2.28 g (0.02 mole) of trans-2,5-dimethylpiperazine was used in place of piperazine. The yield of the purified product was about 82%, the reduced specific viscosity of the product was 0.59, and the piperazine content of the product was 17% based on the total amount of the diamines.

EXAMPLE 4

A purified copolyamide was obtained in completely the same manner as in Example 1 except that 4,4'-diaminodiphenylsulfone was used in place of 3,3'-diaminodiphenylsulfone. The yield of the purified product was about 82%, the reduced specific viscosity (0.5 g/dl sulfuric acid, 30°C.) of the product was 0.69, and the piperazine content of the product obtained by proton NMR was 21% based on the total amount of the diamines.

EXAMPLE 5

A purified copolyamide was obtained in the same manner as in Example 1 except that 2.28 g (0.02 mole) of trans-2,5-dimethylpiperazine was used in place of piperazine. The yield of the purified product was about 79%, the reduced specific viscosity of the product was 0.64, and the piperazine content of the product was 20% based on the total amount of the diamines.

EXAMPLE 6

A purified copolyamide was obtained in the same manner as in Example 1 except that terephthalic acid dichloride was used in place of isophthalic acid dichloride. The yield of the resulting purified product was about 80%, and the reduced specific viscosity of the product was 1.35.

EXAMPLE 7

A purified copolyamide was obtained in completely the same manner as in Example 2 except that terephthalic acid dichloride was used in place of isophthalic acid dichloride. The yield of the purified product was about 80%, the reduced specific viscosity of the product was 0.91, and the trans-2,5-dimethylpiperazine content of the product was 20% based on the total amount of the diamines.

EXAMPLE 8

A mixture of 19.8 g (0.08 mole) of 3,3'-diaminodiphenylsulfone, 2.0 g (0.02 mole) of homopiperazine, 200 ml of N-methyl-2-pyrrolidone and 28 ml of triethylamine was thoroughly stirred in the same manner as in Example 1, and reaction was carried out in the same manner as in Example 1 with addition of a solution of 20.4 g (0.1 mole) of isophthalic acid dichloride in 100 ml of N-methylpyrrolidone while ice-cooling the entire reaction system. Thereafter, in the same manner as in Example 1, precipitation, crushing, filtration, washing and drying were carried out to obtain a purified copolyamide. The yield of the purified product obtained was about 79%, the reduced specific viscosity of the product was 0.64, and the homopiperazine content of the product was 21% based on the total amount of the diamines.

EXAMPLE 9

A purified copolyamide was obtained in completely the same manner as in Example 8 except that the amounts of 3,3'-diaminodiphenylsulfone and homopiperazine were changed to 17.33 g (0.07 mole) and 3.0 g (0.03 mole), respectively. The yield of the purified product obtained was about 76%, the reduced specific viscosity of the product was 0.58, and the homopiperazine content of the product was 25% based on the total amount of the diamines.

EXAMPLE 10

A purified copolyamide was obtained in completely the same manner as in Example 8 except that terephthalic acid dichloride was used in place of isophthalic acid dichloride. The yield of the purified product was about 80%, the reduced specific viscosity of the product was 0.65, and the homopiperazine content of the product was 20% based on the total amount of the diamines.

EXAMPLE 11

A purified copolyamide was obtained in completely the same manner as in Example 9 except terephthalic acid dichloride was used in place of isophthalic acid dichloride. The yield of the purified product was about 82%, the reduced specific viscosity of the product was 0.51, and the homopiperazine content of the product was 27% based on the total amount of the diamines.

COMPARATIVE EXAMPLE 1

10.80 Grams (0.10 mole) of m-phenylenediamine and 150 ml of N-methylpyrrolidone were fed to a 500-ml four-necked round-bottom flask equipped with a nitrogen-feed pipe, a thermometer and a stirrer and made homogenous by stirring. After cooling the solution to 0° C., 20.30 g (0.1 mole) of powdery isophthalic acid dichloride was added at a time with stirring, and isophthalic acid dichloride attached to the inner wall of the flask was washed off with 10 ml of N-methylpyrrolidone. On adding isophthalic acid dichloride, the temperature of the reaction system rose to about 50° C., so that it was returned to room temperature by stirring for about 1 hour with cooling. Stirring was then continued for further 2 hours to complete the reaction. The resulting reaction solution was poured into 1500 ml of methanol to precipitate a polyamide. This precipitate was filtered off, crushed by a home mixer conatining water, washed and vacuum-dried for 24 hours to obtain a purified polyamide. The yield of this polyamide was about 85%, and the reduced specific viscosity of the polyamide was 1.35.

COMPARATIVE EXAMPLE 2

A purified polyamide was obtained in completely the same manner as in Comparative example 1 except that terephthalic acid dichloride was used in place of isophthalic acid dichloride. The yield of this polyamide was about 73%, and the reduced specific viscosity of the polyamide was 1.94.

COMPARATIVE EXAMPLE 3

A copolyamide was obtained in the same manner as in Comparative example 1 except that a mixed diamine compound of m-phenylenediamine and 2,4-diaminobenzenesulfonic acid (molar ratio to the former, 10 mole %) was used. The yield of this copolyamide was 82%, and the reduced specific viscosity of the copolyamide was 0.90.

COMPARATIVE EXAMPLE 4

A copolyamide was obtained in the same manner as in Comparative Example 3 except that terephthalic acid dichloride was used in place of isophthalic acid dichloride. The yield of this copolyamide was about 83%, and the reduced specific viscosity of the copolyamide was 1.13.

COMPARATIVE EXAMPLE 5

8.6 Grams (0.10 mole) of piperazine, 8.4 g (0.21 mole) of sodium hydroxide and 300 cc of water were fed to a 2-liter cylinder to prepare a uniform solution. While stirring the resulting solution with ice-cooling, a solution of 20.3 g (0.10 mole) of isophthalic acid dichloride in 300 ml of cyclohexanone was added and reacted for about 5 minutes with stirring. The resulting reaction product was purified in the same manner as in Example 1 to obtain a purified product. The yield of this product was 67%, and the reduced specific viscosity of the product was 0.91.

Comparative Example 6

A polyamide was obtained in the same manner as in Comparative Example 5 except that terephthalic acid dichloride was used in place of isophthalic acid dichloride. The yield of this polyamide was 68%, and the reduced specific viscosity of the polyamide was 0.98.

COMPARATIVE EXAMPLE 7

0.86 Grams (0.01 mole) of piperazine, 4.32 g (0.04 mole) of m-phenylenediamine, 4.8 g (0.12 mole) of sodium hydroxide and 160 ml of water were fed to a 1-liter cylinder to prepare a uniform solution. While stirring the resulting solution with ice-cooling, a solution of 10.15 g (0.05 mole) of isophthalic acid dichloride in 75 cc of cyclohexanone was added and reacted for about 60 minutes with stirring. Thereafter, 300 cc of n-hexane was added to the reaction product to form precipitates which were then purified in the same manner as in Example 1 to obtain a copolyamide. The yield of this copolyamide was 74%, and the reduced specific viscosity of the copolyamide was 1.34.

COMPARATIVE EXAMPLE 8

A copolyamide was obtained in the same manner as in Comparative Example 7 except that terephthalic acid dichloride was used in place of isophthalic acid dichloride. The yield of this copolyamide was 71%, and the reduced specific viscosity of the copolyamide was 1.26.

COMPARATIVE EXAMPLE 9

A polyamide was obtained in the same manner as in Comparative Example 1 except that 3,3'-diaminodiphenylsulfone was used in place of m-phenylenediamine. The yield of this polyamide was 88%, and the reduced specific viscosity of the polyamide was 0.80.

COMPARATIVE EXAMPLE 10

A polyamide was obtained in the same manner as in Comparative Example 9 except that terephthalic acid dichloride was used in place of isophthalic acid dichloride. The yield of this polyamide was 86%, and the reduced specific viscosity of the polyamide was 1.28.

COMPARATIVE EXAMPLE 11

A polyamide was obtained in the same manner as in Comparative Example 1 except that 4,4'-diaminodiphenylsulfone was used in place of m-phenylenediamine. The yield of this polyamide was 88%, and the reduced specific viscosity of the polyamide was 0.81.

COMPARATIVE EXAMPLE 12

A polyamide was obtained in the same manner as in Comparative Example 11 except that terephthalic acid dichloride was used in place of isophthalic acid dichloride. The yield of this polyamide was 88%, and the reduced specific viscosity of the polyamide was 1.30.

COMPARATIVE EXAMPLE 13

A solution of 5.08 g (0.05 mole) of homopiperazine and 4.20 g (0.10 mole) of sodium hydroxide in 150 ml of water was cooled with ice water, and while violently stirring this solution with a homogenizer, a solution of 10.15 g (0.05 mole) of isophthalic acid dichloride in 150 ml of methylene chloride was added at a time to complete reaction rapidly. Thereafter, the reaction solution was stirred for about 5 minutes, and the solvent was vaporized on a hot water bath to obtain a viscuous polyamide. Unreacted products and the salt were removed from the polyamide using a Soxhlet extractor. The yield of this polyamide was about 73%, and the reduced specific viscosity of the polyamide was 0.75. This polyamide produced with homopiperazine only as the diamine component is insoluable in amide solvents such as N,N-dimethylacetamide, N-methylpyrrolidone, etc., and soluble in m-cresol which is a protic solvent. Preparation of thin membrane was tried with a m-cresol solution of the above polyamide, but the thin membrane obtained was viscous, having no enough strength to make it usable as a reverse osmosis membrane.

COMPARATIVE EXAMPLE 14

A polyamide was obtained in the same manner as in Compartive Example 13 except that terephthalic acid dichloride was used in place of isophthalic acid dichloride. The yield of this polyamide was about 71%, and the reduced specific viscosity of the polyamide was 1.16. Like the polyamide obtained in Comparative Example 13, this polyamide is insoluable in amide solvents such as N,N-dimethylacetamide, N-methylpyrrolidone, etc., and soluable in a mixed solvent of m-cresol which is a protic solvent and trichloroacetic acid (volume ratio, 7:3). Preparation of thin membrane was tried with a solution of the polyamide in the above mixed solvent, but like the thin membrane in Comparative Example 13, this thin membrane obtained had no enough strength to make it usable as a reverse osmosis membrane.

The polyamides obtained in the examples and comparative examples were each dissolved in N,N-dimethylacetamide and N-methyl-2-pyrrolidone, each of which contained 5 wt. % of lithium chloride, to prepare a 20% solution. These polyamide solutions were each coated onto a glass plate in a thickness of 300 microns and heated for 30 minutes in a constant-temperature vessel kept at 110° C. to vaporize the solvent. After cooling, the glass plate was dipped in water to form a thin membrane on it, and the thin membrane was then stripped from the glass plate to prepare an asymmetric membrane. The performances as reverse osmosis membrane of these asymmetric membranes are shown in Table 1.

between the base liquid and the water permeate to the sodium chloride concentration of the base liquid (the larger the value of the percentage, the better the salt removal property). "Chlorine added" means water flux and salt rejection measured upon lapse of 10 hours after supply of a base liquid which is the above 35,000 ppm sodium chloride-containing saline water to which 50

TABLE 1

|  | Example | | | | | | | | | | |
|---|---|---|---|---|---|---|---|---|---|---|---|
|  | 1 | 2 | 3 | 4 | 5 | 6 | 7 | 8 | 9 | 10 | 11 |
| Acid component | I | T | T | I | I | T | T | I | I | T | T |
| Diamine component | | | | | | | | | | | |
| (1) | 3S | 3S | 3S | 4S | 4S | 4S | 4S | 3S | 3S | 3S | 3S |
| (2) | pip | pip | dmp | pip | dmp | pip | dmp | hp | hp | hp | hp |
| Molar ratio (%) | 20 | 20 | 20 | 20 | 20 | 20 | 20 | 20 | 30 | 20 | 30 |
| Film-forming property | ⊙ | ⊙ | ⊙ | ⊙ | ⊙ | ⊙ | ⊙ | ⊙ | ⊙ | ○ | ○ |
| Water flux (liter/m² · day) | | | | | | | | | | | |
| Chlorine not added | 105 | 148 | 107 | 65 | 76 | 73 | 110 | 51 | 83 | 134 | 150 |
| Chlorine added | 104 | 150 | 110 | 64 | 75 | 75 | 108 | 50 | — | 135 | — |
| Salt rejection (%) | | | | | | | | | | | |
| Chlorine not added | 78.0 | 80.8 | 88.4 | 99.3 | 96.3 | 98.6 | 98.3 | 80 | 78 | 76 | 82 |
| Chlorine added | 77.7 | 81.0 | 90.0 | 99.2 | 96.0 | 98.7 | 99.0 | 81 | — | 76 | — |
| Amount of chlorine absorbed (mole/mole) | 0.22 | 0.24 | 0.33 | 0.26 | 0.24 | 0.38 | 0.40 | — | — | — | — |

|  | Comparative example | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Acid component | I | T | I | T | I | T | I | T | I | T | I | T |
| Diamine component | | | | | | | | | | | | |
| (1) | m | m | m | m | — | — | m | m | 3S | 3S | 4S | 4S |
| (2) | — | — | ms | ms | pip | pip | pip | pip | — | — | — | — |
| Molar ratio (%) | — | — | 10 | 10 | — | — | 20 | 20 | — | — | — | — |
| Film-forming property | ○ | △ | ○ | △ | △ | X | X | X | ⊙ | ⊙ | ⊙ | ⊙ |
| Water flux (liter/m² · day) | | | | | | | | | | | | |
| Chlorine not added | 75 | — | 75 | — | 13399 | — | — | — | 84 | 78 | 62 | 51 |
| Chlorine added | 45 | — | 50 | — | — | — | — | — | 82 | 74 | 60 | 51 |
| Salt rejection (%) | | | | | | | | | | | | |
| Chlorine not added | 62 | — | 62 | — | 4.9 | — | — | — | 45 | 55 | 67.5 | 71.5 |
| Chlorine added | 45 | — | 51 | — | — | — | — | — | 43 | 51 | 65.1 | 67.5 |
| Amount of chlorine absorbed (mole/mole) | >1.6 | >1.6 | >1.6 | >1.6 | 0.04 | 0.06 | >1.6 | >1.6 | 0.28 | 0.37 | 0.33 | 0.52 |

In Table 1, symbols I and T of "Acid Component" mean isophthalic acid dichloride and terephthalic acid dichloride, respectively. Symbols 3S, 4S and m of "Diamine component (1)" mean 3,3'-diaminodiphenylsulfone, 4,4'-diaminodiphenylsulfone and m-phenylenediamine, respectively. Symbols pip, dmp, hp and ms of "Diamine component (2)" mean piperazine, trans-2,5-dimethylpiperazine, homopiperazine and m-phenylenediamine-4-sulfonic acid, respectively. "Molar ratio (%) of diamine component" means a molar ratio of the diamine component (2) to the whole diamine components (1) and (2). Symbols ⊙, ○, △ and ×, of "Film-forming property" mean very good, good, poor and impossible, respectively. "Water flux" and "Salt rejection" represent a performance of reverse osmosis membranes, the former meaning the amount (liter/m²·day) of water which, when a 25° C. saline water containing 35,000 ppm of sodium chloride, a base liquid, has been supplied to the common continuous pump-type reverse osmosis apparatus under a pressure of 55 kg/cm², permeates through the apparatus (said water is referred to as water permeate); and the latter meaning a percentage (%) of a difference in sodium chloride concentration ppm of chlorine has previously been added.

"Amount of chlorine absorbed" was obtained as follows: The polyamide to be tested is freeze-crushed and vacuum-dried at a temperature of 150° C. for about 15 hours; 0.5 g of fine powders of 10 microns or less in size thus obtained is added to 500 cc of an aqueous chlorine solution having a chlorine concentration of about 220 ppm and a pH of 5, obtained by mixing sodium hypochloride (chlorine source) and phosphoric acid, potassium dihydrogenphosphate and dipotassium hydrogenphosphate, all of which are a buffer for pH adjustment; the aqueous chlorine solution is placed in a constant-temperature vessel kept at 40° C. and a chlorine absorption rate is obtained by measuring a change in the chlorine concentration with the lapse of time of the aqueous chlorine solution; and a difference of the chlorine absorption rate thus obtained and that of the blank test previously conducted, i.e. a rate at which the chlorine concentration of said aqueous chlorine solution containing no polyamide spontaneously decreases to zero, is taken as the chlorine absorption rate of the polyamide itself, and the amount of chlorine absorbed during 1 hour after the beginning of the chlorine rate measurement test is expressed in a molar ratio to 1 mole of the monomers constituting the polyamide. The smaller the value of the molar ratio, the higher the chlorine resistance of the polyamide.

EXAMPLES 12 TO 17

Copolyamides were obtained in the same manner as in Example 2 and Example 3 except that, in the former case, the amount of piperazine in the mixed diamine, as expressed by molar ratio, was changed from 20 mole % to 10, 30 and 60 mole %, and that in the latter case, the amount of trans-2,5-dimethylpiperazine in the mixed diamine, as expressed by molar ratio, was changed from 20 mole % to 10, 30 and 60 mole %. The yield of these copolyamides was in a range of from 80 to 90%, and the reduced specific viscosity of the copolyamides was in a range of from 0.70 to 1.0. These copolymers, even if the piperazine content increases to 60 mole % of the total amount of the mixed diamine, had a solubility of 20 wt. % or more in N-methylpyrrolidone and N,N-dimethylacetamide, showing a good film-forming property. The test results of performances of the copolyamides are shown in Table 2.

TABLE 2

| | Example No. | | | | | |
|---|---|---|---|---|---|---|
| | 12 | 13 | 14 | 15 | 16 | 17 |
| Acid component | T | | | | | |
| Diamine component | | | | | | |
| (1) | | | 3S | | | |
| (2) | pip | | | dmp | | |
| Molar ratio (%) | 10 | 30 | 60 | 10 | 30 | 60 |
| Film-forming property | ◉ | ◉ | ◉ | ◉ | ◉ | ◉ |
| Water flux (liter/m² · day) | | | | | | |
| Chlorine not added | 110 | 153 | 174 | 95 | 142 | 156 |
| Chlorine added | 110 | 154 | 175 | 96 | 143 | 155 |
| Salt rejection (%) | | | | | | |
| Chlorine not added | 83.4 | 90.2 | 79.8 | 90.5 | 85.7 | 83.3 |
| Chlorine added | 83.3 | 90.3 | 80.0 | 90.6 | 85.8 | 83.2 |
| Amount of chlorine absorbed (mole/mole) | 0.28 | 0.17 | 0.12 | 0.40 | 0.21 | 0.15 |

EXAMPLES 18 TO 25

Copolyamides were obtained in the same manner as in Example 4 and Example 7 except that, in the former case, the amount of piperazine in the mixed diamine, as expressed by molar ratio, was changed from 20 mole % to 10, 30, 40 and 60 mole %, and that in the latter case, the amount of trans-2,5-dimethylpiperazine in the mixed diamine, as expressed by molar ratio, was changed from 20 mole % to 10, 30, 40 and 60 mole %. The yield of these copolyamides was in a range of from 80 to 90%, and the reduced specific viscosity of the copolyamides was in a range of from 0.70 to 1.0. These copolyamides, even if the piperazine content increase to 60 mole % of the total amount of the mixed diamine, had a soluability of 20 wt. % or more in N-methylpyrrolidone and N,N-dimethylacetamide, showing a good film-forming property. The test results of performances of the copolyamides are shown in Table 3.

TABLE 3

| | Example No. | | | | | | | |
|---|---|---|---|---|---|---|---|---|
| | 18 | 19 | 20 | 21 | 22 | 23 | 24 | 25 |
| Acid component | I | | | | T | | | |
| Diamine component | | | | | | | | |
| (1) | | 4S | | | | 4S | | |
| (2) | | pip | | | | dmp | | |
| Molar ratio (%) | 10 | 30 | 40 | 60 | 10 | 30 | 40 | 60 |
| Film-forming property | ◉ | ◉ | ◉ | ◉ | ◉ | ◉ | ◉ | ◉ |
| Water flux (liter/m² · day) | | | | | | | | |
| Chlorine not added | 58 | 98 | 125 | 138 | 69 | 52 | 87 | 112 |
| Chlorine added | 57 | 100 | 124 | 135 | 68 | 52 | 88 | 115 |
| Salt rejection (%) | | | | | | | | |
| Chlorine not added | 97.2 | 97.9 | 97.4 | 94.8 | 98.2 | 95.6 | 95.3 | 91.5 |
| Chlorine added | 97.3 | 98.0 | 97.3 | 95.0 | 98.0 | 95.3 | 95.2 | 91.3 |
| Amount of chlorine absorbed (mole/mole) | 0.30 | 0.28 | 0.31 | 0.27 | 0.43 | 0.42 | 0.44 | 0.43 |

EXAMPLES 26 TO 29

Copolyamides were obtained in the same manner as in Example 1 and Example 3 except that, in the both cases, 4,4'-diaminodiphenylsulfone (4S) was added to 3,3'-diaminodiphenylsulfone (3S) so that the molar ratio of 3S to 4S to piperazine in the mixed diamine was made 56:24:20 and 24:56:20. These copolyamides had a solubility of 20 wt. % or more in N-methylpyrrolidone and N,N-dimethylacetamide, showing a good film-forming property. The performances of the copolyamide membranes are shown in Table 4.

TABLE 4

| | Example No. | | | |
|---|---|---|---|---|
| | 26 | 27 | 28 | 29 |
| Acid component | I | T | I | T |
| Diamine component | | | | |
| (1) | 3S | 3S | 4S | 4S |
| (1)' | 4S | 4S | 3S | 3S |
| (2) | pip | dmp | pip | dmp |
| Molar ratio (%) | 56/24/20 | 56/24/20 | 56/24/20 | 56/24/20 |
| Water flux (liter/m² · day) | | | | |
| Chlorine not added | 72 | 107 | 73 | 98 |
| Chlorine added | 71 | 102 | 70 | 97 |
| Salt rejection (%) | | | | |
| Chlorine added | 75 | 93.4 | 98.7 | 98.5 |
| Chlorine not added | 74.1 | 90.1 | 98.5 | 98.0 |
| Amount of chlorine absorbed (mole/mole) | 0.33 | 0.55 | 0.31 | 0.39 |

The permselective membranes obtained by the present invention have not only excellent film-forming property and reverse osmosis property, but also particularly excellent chlorine resistance, which makes them suitable for the desalination of sea water and salt water.

What is claimed is:

1. A permselective membrane consisting mainly of a copolyamide prepared by the reaction of an aromatic polycarboxylic acid component with a mixed diamine component comprising a diaminodiphenylsulfone compound of the general formula (I),

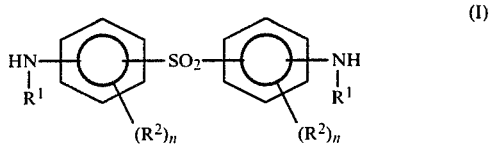

(I)

wherein $R^1$ represents hydrogen atom or a $C_1$–$C_{12}$ hydrocarbon group, $R^2$s may be the same or different, each representing a monovalent organic group, and n represnets an integer of 0 or 1 to 3, and an alicyclic diamine compound containing two secondary amino groups in the same or different ring(s), the molar ratio of the diaminodiphenylsulfone compound to alicyclic diamine being 95/5 to 35/65.

2. A permselective membrane of claim 1 wherein the diaminodiphenylsulfone compound is a 3,3'-diaminodiphenylsulfone compound of the formula (II),

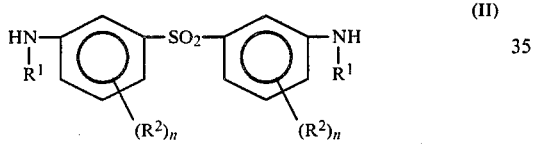

(II)

wherein $R^1$ and $R^2$ are as defined in claim 1.

3. A permselective membrane of claim 1 wherein the diaminodiphenylsulfone compound is a 4,4'-diaminodiphenylsulfone compound of the formula (III),

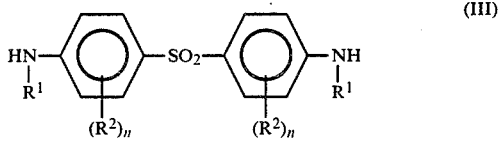

(III)

wherein $R^1$ and $R^2$ are as defined in claim 1.

4. A permselective membrane of claim 1 wherein the diaminodiphenylsulfone compound is a mixture of a 3,3'-diaminodiphenylsulfone compound of the formula (II) and 4,4'-diaminodiphenylsulfone compound of the formula (III), the molar ratio of the compound of the formula (II) to the compound of the formula (III) being 50/50 to 0/100.

5. A permselective membrane of claim 2 wherein the 3,3'-diaminodiphenylsulfone compound is 3,3'-diaminodiphenylsulfone.

6. A permselective membrane of claim 3 wherein the 4,4'-diaminodiphenylsulfone compound is 4,4'-diaminodiphenylsulfone.

7. A permselective membrane of claim 1 wherein the alicyclic diamine is a piperazine compound of the formula (IV),

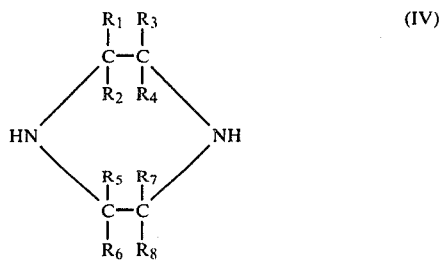

(IV)

wherein $R_1$, $R_2$, $R_3$, $R_4$, $R_5$, $R_6$, $R_7$ and $R_8$ may be all of partly the same or different and each of them represents hydrogen atom or a $C_1$–$C_{12}$ hydrocarbon group.

8. A permselective membrane of claim 7 wherein the piperazine compound of the formula (IV) is piperazine in which all of $R_1$ to $R_8$ in the formula (IV) are hydrogen atoms.

9. A permselective membrane of claim 7 wherein the piperazine compound of the formula (IV) is trans-2,5-dimethylpiperazine.

10. A permselective membrane of claim 1 wherein the alicyclic diamine is homopiperazine of the formula (V),

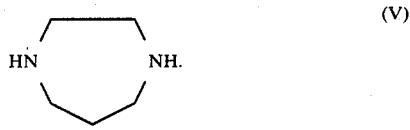

(V)

11. A permselective membrane of claim 1 wherein the alicyclic diamine is a mixture of the piperazine compound of the formula (IV) in claim 7 and homopiperazine of the formula (V) in claim 10.

12. A permselective membrane of claim 1 wherein the molar ratio of the diaminodiphenylsulfone compound to the alicyclic diamine is 90/10 to 40/60.

13. A permselective membrane of claim 1 wherein the molar ratio of the diaminodiphenylsulfone compound to the alicyclic diamine is 90/10 to 60/40.

14. A permselective membrane of claim 1 wherein the aromatic polycarboxylic acid component is isophthalic acid or isophthalic acid halide.

15. A permselective membrane of claim 1 wherein the aromatic polycarboxylic acid component is terephthalic acid or terephthalic acid halide.

16. A permselective membrane of claim 1 wherein the aromatic polycarboxylic acid component is a mixture of isophthalic acid or isophthalic acid halide and terephthalic acid or terephthatic acid halide.

17. A permselective membrane of claim 16 wherein the iso/tere molar ratio is 50/50 to 100/0.

18. A permselective membrane of claim 16 wherein the iso/tere molar ratio is 65/35 to 90/10.

19. A permselective membrane of claim 4 wherein the 3,3'-diaminodiphenylsulfone compound is 3,3'-diaminodiphenylsulfone.

20. A permselective membrane of claim 4 wherein the 4,4'-diaminodiphenylsulfone compound is 4,4'-diaminodiphenylsulfone.

* * * * *